United States Patent
Handelman et al.

[11] Patent Number: 5,878,134
[45] Date of Patent: *Mar. 2, 1999

[54] SECURE ACCESS SYSTEMS UTILIZING MORE THAN ONE IC CARD

[75] Inventors: Doron Handelman, Givataim; Moshe Kranc; David Fink, both of Jerusalem; Arnold Zucker, Ramat Modiim; Perry Smith, Jerusalem; Gerson Bar-On, Kohav Hashahar, all of Israel

[73] Assignee: News Data Com Ltd., London, England

[ * ] Notice: The term of this patent shall not extend beyond the expiration date of Pat. No. 5,666,412.

[21] Appl. No.: 925,547

[22] Filed: Sep. 8, 1997

Related U.S. Application Data

[63] Continuation of Ser. No. 375,995, Jan. 20, 1995, Pat. No. 5,666,412.

[30] Foreign Application Priority Data

Oct. 3, 1994 [IL] Israel ................................... 111151

[51] Int. Cl.⁶ .............................. H04L 9/00; H04N 7/167; G06F 7/04
[52] U.S. Cl. ................................ 380/4; 380/16; 380/20; 380/21; 380/25; 395/186; 340/825.31; 235/382
[58] Field of Search ................................ 235/380, 382; 380/4, 16, 20, 21, 25, 5; 348/1, 3, 5.5; 340/825.31; 395/186, 187.01, 188.01

[56] References Cited

U.S. PATENT DOCUMENTS

| | | | |
|---|---|---|---|
| 3,859,508 | 1/1975 | Brosow et al. | 235/380 |
| 3,996,450 | 12/1976 | Kerkhoff | 235/61.7 B |
| 4,325,078 | 4/1982 | Seaton et al. | 380/16 |
| 4,450,535 | 5/1984 | de Pommery et al. | 364/900 |
| 4,594,663 | 6/1986 | Nagata et al. | |
| 4,613,901 | 9/1986 | Gilhousen et al. | 380/20 |
| 4,709,136 | 11/1987 | Watanabe | |
| 4,718,107 | 1/1988 | Hayes | 455/4 |
| 4,751,732 | 6/1988 | Kamitake | 380/20 |
| 4,768,229 | 8/1988 | Benjamin et al. | 380/20 |
| 4,780,791 | 10/1988 | Morita et al. | 235/492 X |
| 4,870,261 | 9/1989 | Mancini et al. | 235/382 |
| 4,882,473 | 11/1989 | Bergeron et al. | 235/380 |
| 4,908,834 | 3/1990 | Wiedemer | 380/5 |
| 4,961,142 | 10/1990 | Elliot et al. | 380/21 |
| 4,993,066 | 2/1991 | Jenkins | 380/16 |
| 5,010,571 | 4/1991 | Katznelson | |
| 5,060,079 | 10/1991 | Rufus-Isaacs | 348/1 |
| 5,065,429 | 11/1991 | Lang | 380/25 |
| 5,111,504 | 5/1992 | Esserman et al. | 380/21 |
| 5,214,699 | 5/1993 | Monroe et al. | 380/23 |

(List continued on next page.)

FOREIGN PATENT DOCUMENTS

| | | |
|---|---|---|
| 0562295 | 9/1993 | European Pat. Off. |
| 683613 | 11/1995 | European Pat. Off. |
| WO 89/08899 | 9/1989 | WIPO |

OTHER PUBLICATIONS

G. Monnin, Smart Cards for Conditional Access: A Security And Marketing Tool Smartcrypt: The Pay–TV System From Schlumberger, 18th Int'l TV Symp., Montreux, Switz., Jun. 1993, pp. 743–757.

Primary Examiner—Gail O. Hayes
Assistant Examiner—Pinchus M. Laufer
Attorney, Agent, or Firm—Limbach & Limbach LLP

[57] ABSTRACT

A secure access system for controlling access to a plurality of items. The system includes a first IC card reader adapted to receive a first IC card which includes first control information, a second IC card reader adapted to receive a second IC card which includes second control information, and a control integrator receiving the first control information and the second control information and allowing access to a first one of the plurality of items based, at least in part, on both the first control information and said second control information, and to a second one of the plurality of items based, at least in part, on the first control information, without regard to the second control information.

16 Claims, 8 Drawing Sheets

U.S. PATENT DOCUMENTS

| | | | |
|---|---|---|---|
| 5,243,175 | 9/1993 | Kato | 235/435 |
| 5,272,753 | 12/1993 | Nakayama et al. | 380/23 |
| 5,282,249 | 1/1994 | Cohen et al. | 380/23 |
| 5,311,396 | 5/1994 | Steffen | 361/736 |
| 5,319,705 | 6/1994 | Halter et al. | 380/4 |
| 5,337,358 | 8/1994 | Axelrod et al. | 380/23 |
| 5,428,685 | 6/1995 | Kadooka et al. | 380/25 |
| 5,434,395 | 7/1995 | Storck et al. | 235/380 |
| 5,461,217 | 10/1995 | Claus | 235/380 |
| 5,471,045 | 11/1995 | Geronimi | 235/492 |
| 5,481,609 | 1/1996 | Cohen et al. | 380/16 |
| 5,509,073 | 4/1996 | Monnin | 380/20 |
| 5,526,428 | 6/1996 | Arnold | 380/25 |
| 5,534,857 | 7/1996 | Laing et al. | 340/825.34 |
| 5,553,155 | 9/1996 | Kuhns et al. | 340/825.31 X |
| 5,559,885 | 9/1996 | Drexler et al. | 380/23 |
| 5,592,619 | 1/1997 | Shona | 395/186 |
| 5,629,508 | 5/1997 | Findley, Jr. et al. | 235/380 X |

SECURE ACCESS SYSTEMS UTILIZING MORE THAN ONE IC CARD

This is a continuation of application Ser. No. 08/375,995, filed Jan. 20, 1995, now U.S. Pat. No. 5,666,412.

The present invention relates to secure access systems generally and more particularly to secure access systems which employ integrated circuit cards.

BACKGROUND OF THE INVENTION

Access systems generally provide access to restricted means, such as communication systems and data, or to restricted areas such as buildings and departments. There are known in the art access systems which employ integrated circuit (IC) cards, or as more commonly referred to "smart cards", to provide secure access to restricted means or areas.

Smart cards are employed in systems such as pay TV systems and telephone systems. Such systems generally employ one card per unit which is to be accessed, whereby access is enabled whenever a valid smart card is inserted in a card slot.

U.S. Pat. No. 4,709,136 to Watanabe describes an IC card reader/writer apparatus which includes at least two contactors in which IC cards are inserted, respectively, card detecting means for detecting that at least two IC cards have been loaded, and collating means verifying that correct cipher codes of the two IC cards coincide with those inputted externally, respectively, wherein access to the contents stored in the IC cards is allowed only when the collation results in coincidence.

U.S. Pat. No. 4,594,663 to Nagata et al describes a credit transaction processing system which processes data related to a commodity entered into by using a card owned by a customer and a recording card owned by a store.

U.S. Pat. No. 5,010,571 to Katznelson describes a system for controlling and accounting for retrieval of data from a CD-ROM memory containing encrypted data files from which retrieval must be authorized.

SUMMARY OF THE INVENTION

The present invention seeks to provide access systems having improved security and flexible applications.

The term "access systems" is used throughout the specification and claims in a broad sense to include systems which allow controlled access to communication apparatus, software programs, restricted areas, such as buildings, terrain and departments in a plant, television and cable television transmissions, video programs, audio programs, computer data and electronic mail and voice information.

The term "CATV systems" is used throughout the specification and claims in a broad sense to include any form of pay TV systems which are either one-way systems or two-way systems utilizing cable communication networks, satellite communication networks, telephone communication networks or any combination thereof.

There is thus provided in accordance with a preferred embodiment of the present invention secure access apparatus for controlling access to a plurality of items, the apparatus including a first IC card reader adapted to receive a first IC card including first control information, a second IC card reader adapted to receive a second IC card including second control information, and a control integrator receiving the first control information and the second control information and operative to allow access to a first one of the plurality of items based, at least in part, on both the first control information and the second control information, wherein the control integrator also allows access to a second one of the plurality of items based, at least in part, on the first control information, without regard to the second control information.

Further in accordance with a preferred embodiment of the present invention the second control information includes parental control information.

Still further in accordance with a preferred embodiment of the present invention the plurality of items includes a plurality of television programs.

Additionally in accordance with a preferred embodiment of the present invention the plurality of items includes a plurality of digital messages.

Moreover in accordance with a preferred embodiment of the present invention at least one of the plurality of digital messages includes a computer program.

Further in accordance with a preferred embodiment of the present invention at least one of the plurality of digital messages includes data.

Still further in accordance with a preferred embodiment of the present invention the at least one of the plurality of digital messages includes multimedia data.

Additionally in accordance with a preferred embodiment of the present invention the second control information includes payment information.

There is also provided in accordance with another preferred embodiment of the present invention a method for controlling access to a plurality of items, the method including receiving a first IC card including first control information, receiving a second IC card including second control information, and allowing access to a first one of the plurality of items based, at least in part, on both the first control information and the second control information, wherein the step of allowing access includes allowing access to a second one of the plurality of items based, at least in part, on the first control information, without regard to the second control information.

Further in accordance with a preferred embodiment of the present invention the second control information includes payment information.

Still further in accordance with a preferred embodiment of the present invention the plurality of items includes a plurality of television programs.

Additionally in accordance with a preferred embodiment of the present invention the plurality of items includes a plurality of digital messages.

Moreover in accordance with a preferred embodiment of the present invention at least one of the plurality of digital messages includes a computer program.

Further in accordance with a preferred embodiment of the present invention the second control information includes parental control information.

Still further in accordance with a preferred embodiment of the present invention at least one of the plurality of digital messages includes data.

Additionally in accordance with a preferred embodiment of the present invention the at least one of the plurality of digital messages includes multimedia data.

BRIEF DESCRIPTION OF THE DRAWINGS

The present invention will be understood and appreciated more fully from the following detailed description, taken in conjunction with the drawings in which.

DETAILED DESCRIPTION OF PREFERRED EMBODIMENTS

Figure 1:
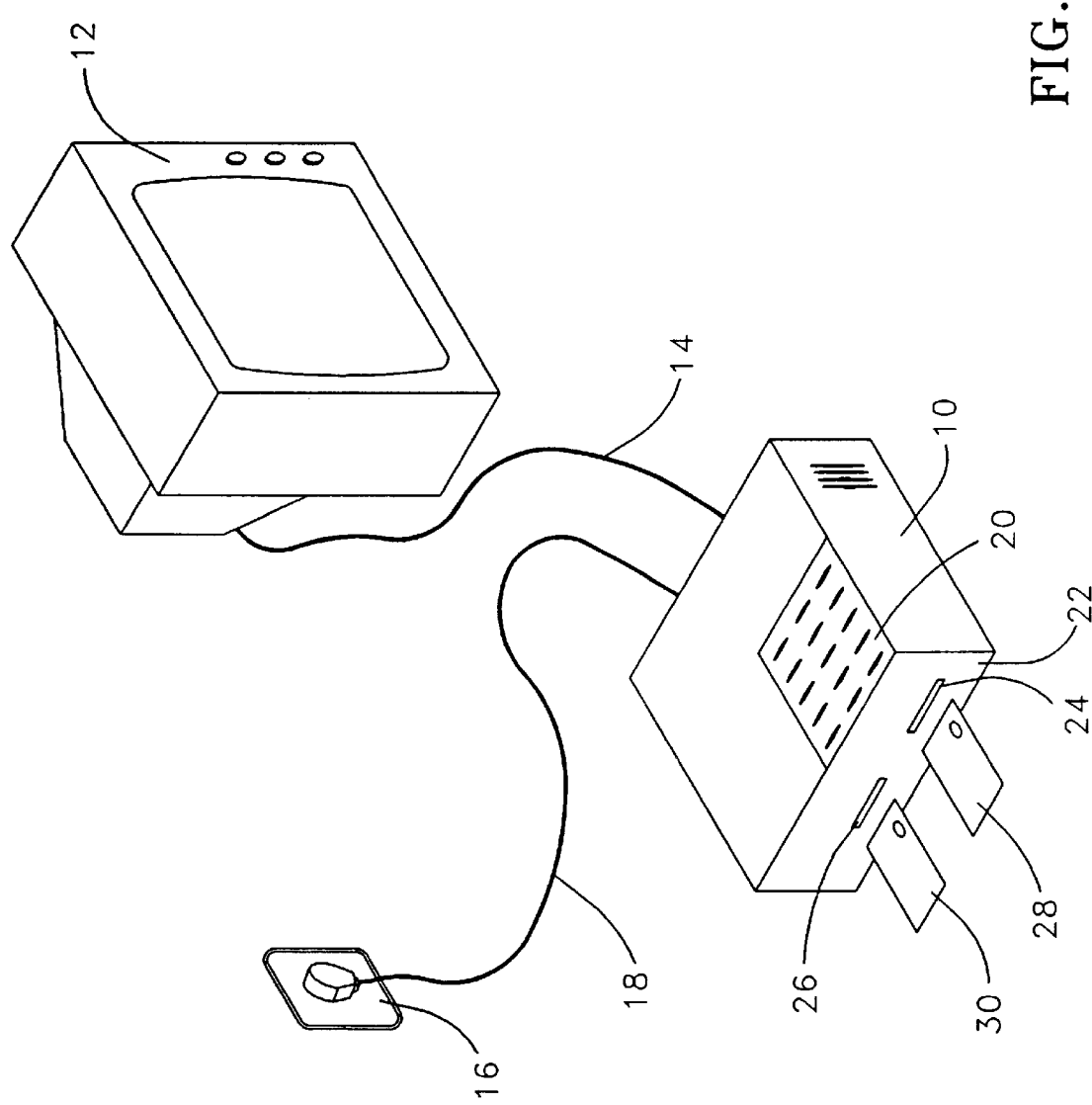
FIG. 1 is a generalized block diagram illustration of a parental control system in a CATV system constructed and operative in accordance with a preferred embodiment of the present invention.

Reference is now made to FIG. 1, which is a generalized illustration of a parental control system in a CATV system constructed and operative in accordance with a preferred embodiment of the present invention.

At a subscriber location a CATV decoder 10 is coupled to a television 12 via a coaxial cable 14. CATV decoder 10 is preferably fed from a CATV network (not shown) via a cable outlet 16 and a coaxial cable 18. CATV decoder 10 is preferably operated by a remote control (not shown) or a built-in keypad 20.

CATV decoder includes, at a front panel 22, two card receptacles 24 and 26. Preferably, card receptacles 24 and 26 may accept smart cards 28 and 30 respectively. Smart cards 28 and 30 are hereinafter referred to as the main card and the parent card respectively. CATV decoder 10 is operative to decrypt CATV programs which are transmitted from a remote location under control of the main card and the parent card which are operative to participate in any of an authentication procedure, a validation procedure and a verification procedure and to provide program entitlements.

Figure 2:
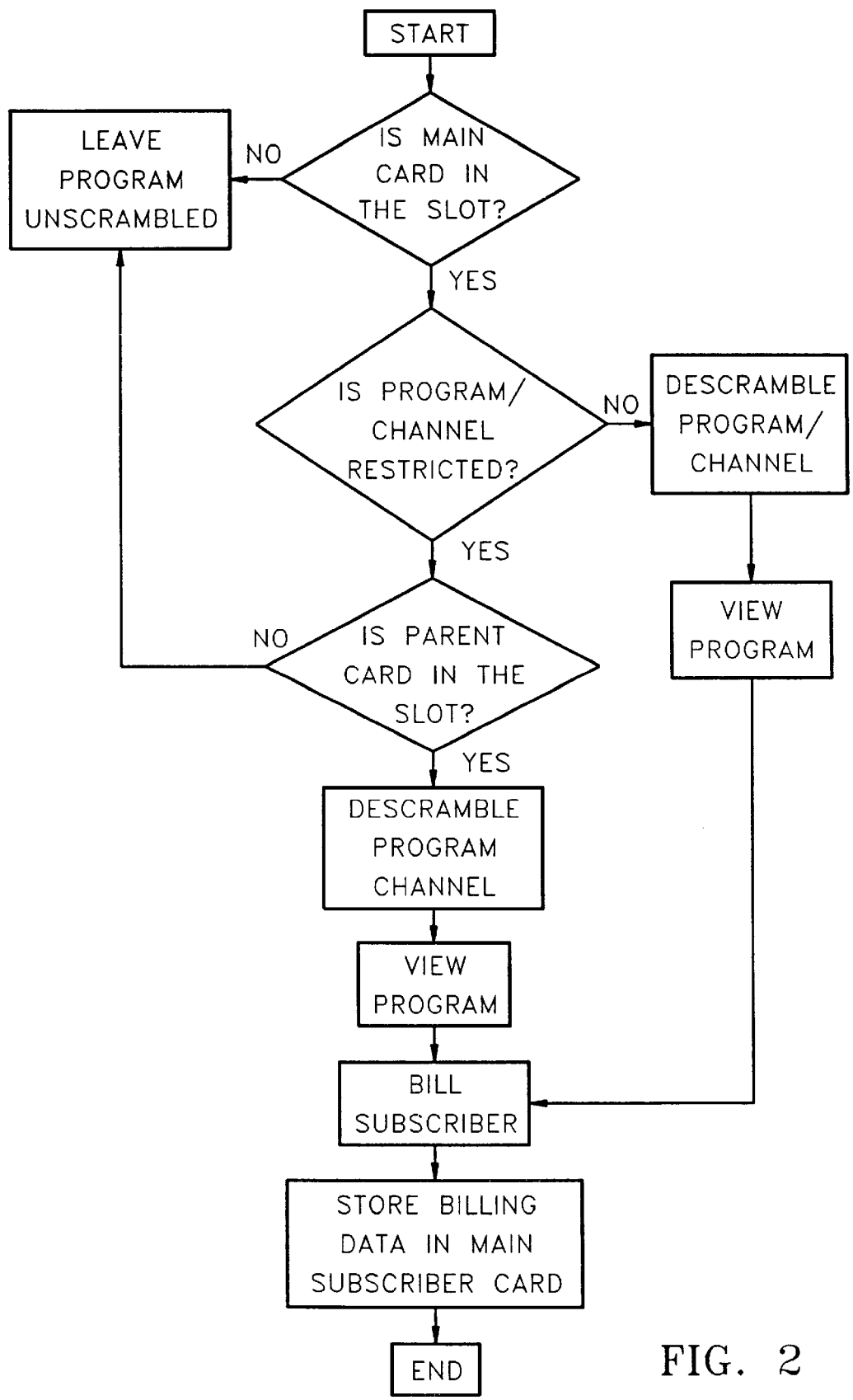
FIG. 2 is a flow chart illustration of the functionality of the parental control system of FIG. 1 in accordance with a preferred embodiment of the present invention.

Reference is now made to FIG. 2 which is a flow chart diagram of the operation of the parental control system of FIG. 1 in accordance with a preferred embodiment of the present invention.

When the main card is inserted in the card receptacle 24 of FIG. 1 and the parent card is not present in card receptacle 26 of FIG. 1, only programs which are not restricted for viewing under parental control are decrypted so that they can be intelligibly viewed on television 12.

If both the main card and the parent card are inserted in card receptacles 24 and 26 respectively, both programs which are restricted for viewing under parental control and programs which are not restricted for viewing under parental control are intelligibly displayed on television 12. Thus the parent card enables decryption of restricted programs in the presence of the main card. If the main card is removed from card receptacle 24 none of the transmitted programs is decrypted. However, if the parent card is removed from card receptacle 26 only programs which are restricted for viewing under parental control are not decrypted.

In a preferred embodiment of the invention billing data is also kept in the main card. In that case the main card retains billing data of programs which are not restricted for viewing under parental control as well as billing data of programs which are restricted for viewing under parental control. Additionally, separate accounts may be held for restricted programs and for non-restricted programs. Preferably, the separate accounts may be accessed by separate accounting identification codes.

In another preferred embodiment of the invention the parent card may retain initialization data and algorithms for initialization of an authentication procedure which is performed when the main card is changed. Most smart card based CATV systems require replacement of the smart cards, either periodically or upon suspect that the CATV system has been compromised. In that case, new smart cards are sent to the subscribers, generally by mail. However, since mailed smart cards are subject to possible theft, it is preferred that the mailed smart cards do not contain any entitlements or valuable data which may be stolen or compromised.

Preferably, the main card at a subscriber location may be frequently replaced while the parent card is seldom replaced. In that case all entitlements and billing data remaining in the main card since last report to a billing facility may be transmitted to the parent card prior to replacement of the main card. When the subscriber receives a new main card and places it in card receptacle 24, the parent card automatically starts an initialization algorithm which employs two way communication between the parent card and the new main card to provide authentication, verification, validation or a combination thereof of the main card. If the new main card is found to be valid the parent card transfers all entitlements for non-restricted programs and billing data, remaining in the old main card since last report to a billing facility, to the new main card. Thus, stealing of the new main card prior to performing the initialization algorithm provides no benefit to a thief.

It is to be appreciated that card receptacles 24 and 26 may be interchangeable so that each of the smart cards, i.e. the main card and the parent card, may be inserted in any of the card receptacles 24 and 26. In such a case a smart card reader/writer, incorporated within CATV decoder 10 of FIG. 1, determines which of the main card and the parent card are inserted in any of the card receptacles 24 and 26. CATV decoder 10 is then operative to decrypt non-restricted programs when the main smart card is inserted in any of the card receptacles 24 and 26, and restricted programs when both the main card and the parent card are inserted in both card receptacles 24 and 26.

Figure 3:
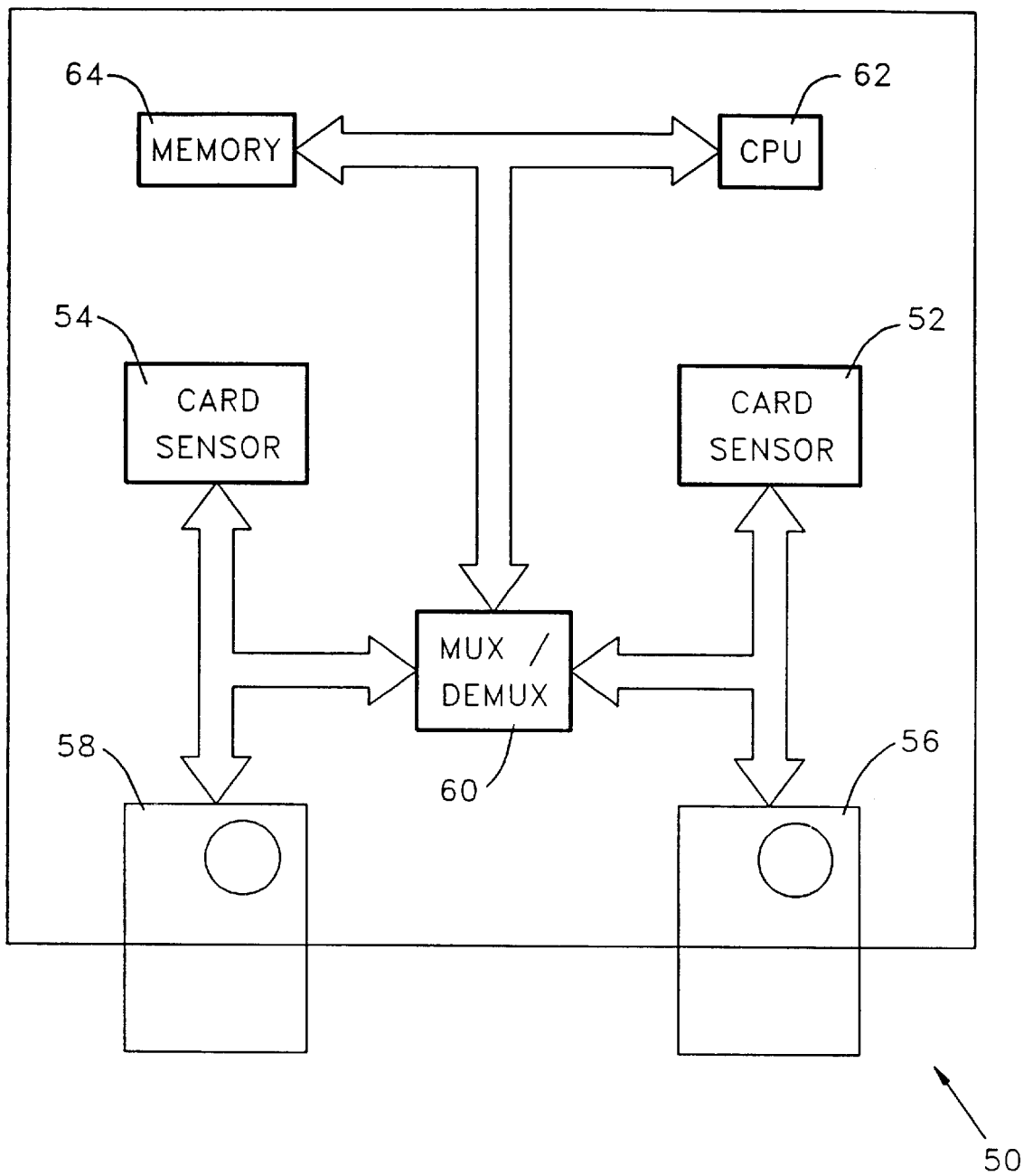
FIG. 3 is an illustration of a card reader/writer unit constructed and operative in accordance with a preferred embodiment of the present invention.

Reference is now made to FIG. 3 which is an illustration of a card reader/writer unit constructed and operative in accordance with a preferred embodiment of the present invention.

The card reader/writer unit of FIG. 3, generally denoted by reference numeral 50, may be embodied in various access systems, such as a CATV system. In that case, card reader/writer unit 50 may be part of a CATV decoder, such as CATV decoder 10 (FIG. 1).

Card read/writer 50 includes two card sensors 52 and 54, a multiplexer/demultiplexer (MUX/DEMUX) 60, a CPU 62 and a memory 64. Card sensors 52 and 54 detect the existence of smart cards 56 and 58 in the respective card receptacles. Card sensors 52 and 54 also read data stored in the smart cards 56 and 58 and provide it to MUX/DEMUX 60. MUX/DEMUX 60 provides multiplexed data received from both smart cards 56 and 58 to a CPU 62 and a memory 64.

In a write sequence, CPU 62 and memory 64 provide data to be written on at least one of the smart cards 56 and 58 to MUX/DEMUX 60 which is operable to demultiplex the data and provide it to the respective card via the respective card sensors 52 and 54.

Figure 4:
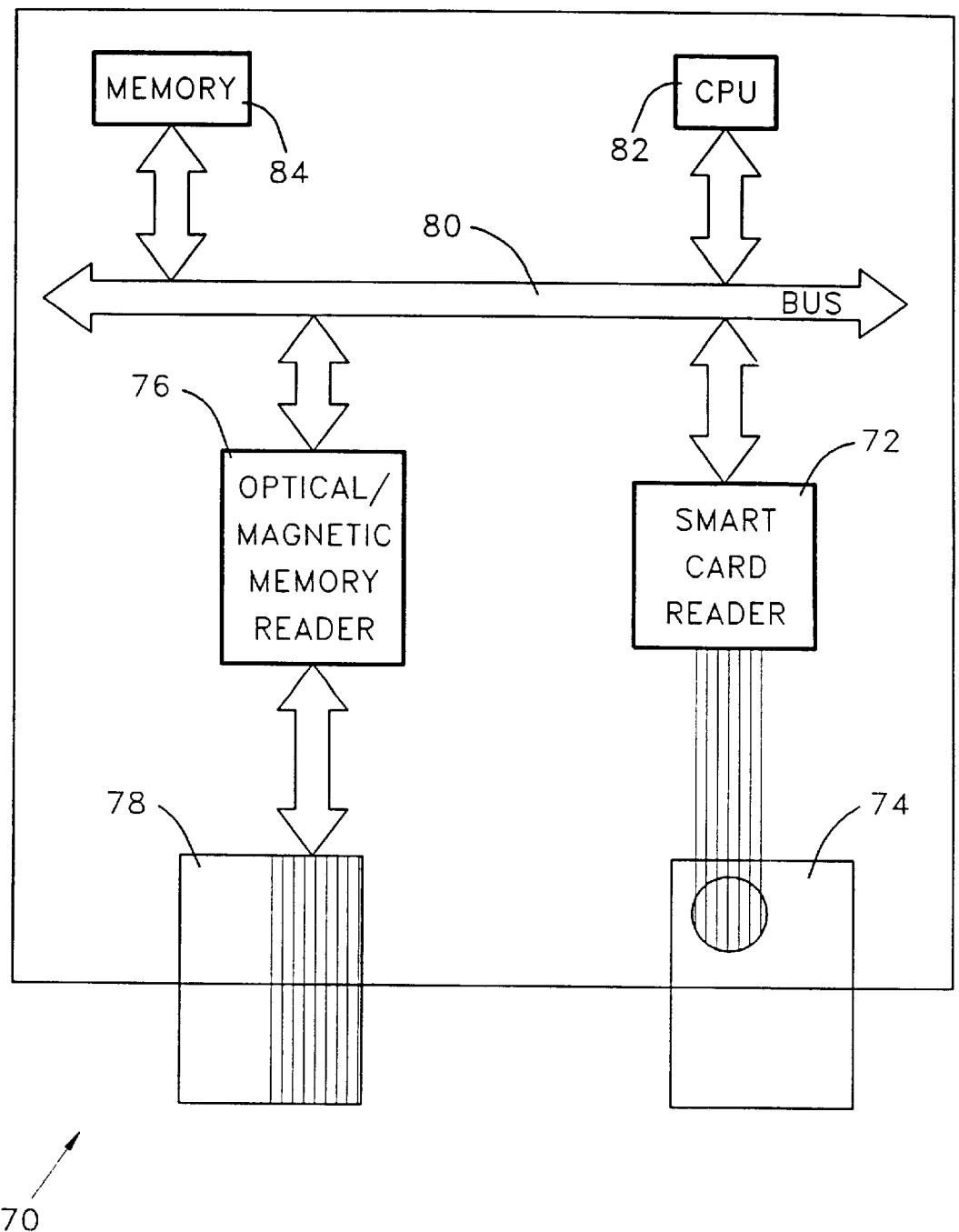
FIG. 4 is an illustration of a combined memory card and smart card reader/writer unit constructed and operative in accordance with a preferred embodiment of the present invention.

Reference is now made to FIG. 4 which is an illustration of a combined memory card and smart card reader/writer unit constructed and operative in accordance with a preferred embodiment of the present invention.

Combined memory card and smart card reader/writer unit, generally denoted by reference numeral 70, includes a smart card reader/writer 72 which is capable of reading/writing a smart card 74 and a memory card reader/writer 76 which is capable of reading/writing a memory card 78. It is to be appreciated that memory card 78 may be an optical memory card, a magnetic memory card or a magnetic disk.

Combined memory card and smart card reader/writer unit 70 also includes a communication BUS 80, a CPU 82 and a memory 84. Smart card reader/writer 72 and memory card reader/writer 76 are operable to provide two-way communication with CPU 82 and memory 84 and with smart card 74 and memory card 78 via the communication BUS 80.

Figure 5:
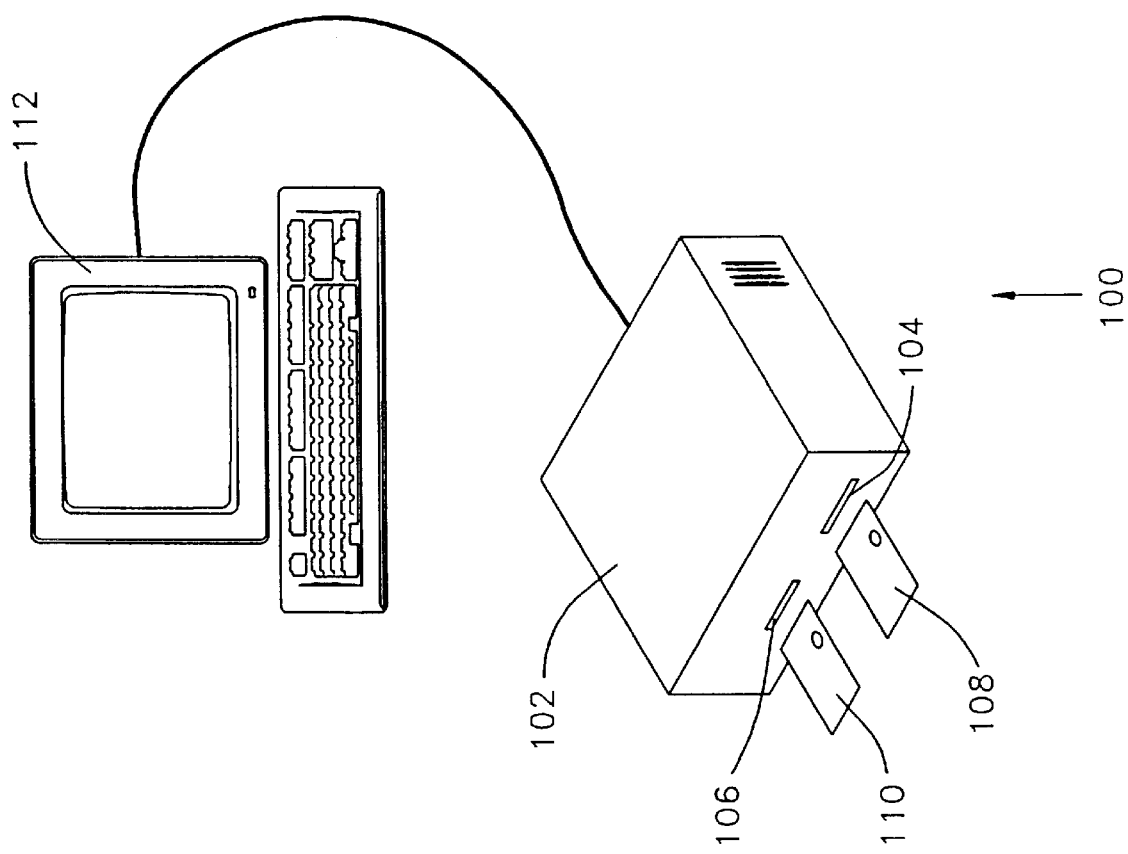
FIG. 5 is an illustration of an access system constructed and operative in accordance with a preferred embodiment of the invention.

Reference is now made to FIG. 5 which is an illustration of an access system constructed and operative in accordance with a preferred embodiment of the invention.

The access system of FIG. 5, generally denoted by reference numeral 100, may be employed to provide access to restricted areas such as buildings, stadiums and departments. It is especially suitable for use with racetrack facilities where access to horses, stables and riders' rooms are restricted to employees and key personnel only. Such applications require the features of personnel licensing and identification to be provided by the access system.

In accordance with a preferred embodiment of the invention the access system 100 includes an identifier station 102 with two card receptacles 104 and 106 incorporated within. Card receptacles 104 and 106 may accept a identification element 108 and an application element 110 respectively. License card 108 preferably includes personal and official information, as well as a digitized photograph to identify a card bearer, whereas application element 110 is the key to writing and reading all information stored in identification elements of the type of identification element 108. It is to be appreciated that when application element 110 is not present in card receptacle 106 fresh data cannot be stored in identification element 108 and existing information is inaccessible.

Part of the information in identification element 108 is clear and part is encrypted. The clear information may include the name and picture of the card bearer whereas the encrypted information may include the sites to which the card bearer is entitled to enter, racetrack commission name, restrictions relevant to racing and history events. The clear information may be read by any suitable smart card reader and the output is intelligible. The encrypted information may also be read by any smart card reader but the output is not intelligibly reproduced, unless read by identifier station 102 with both application element 110 and identification element 108 present in the corresponding card receptacles.

In accordance with a preferred embodiment of the invention various security levels may be employed in the system. Preferably, a selected security level is part of the input entered in one of application element 110 and identification element 108 or in both application element 110 and identification element 108. The security level may be a number between 0 and 3, where 0 denotes no encryption and 3 denotes the highest level of encryption. Thus, identification element 108 may include security level 0 and application element 110 may include a security level between 1 to 3. Alternatively, both application element 110 and identification element 108 may be encrypted.

Preferably, access system 100 reads the information stored in application element 110 and identification element 108 and provides at least part of it to a computer 112 which displays the information on a display, which may be the computer display. Alternatively, the information may be displayed on an internal display which is incorporated within access system 100. Preferably, the computer display and the internal display are suitable to display with high quality, the picture of the card bearer which is stored in the identification element 108.

Figure 6:
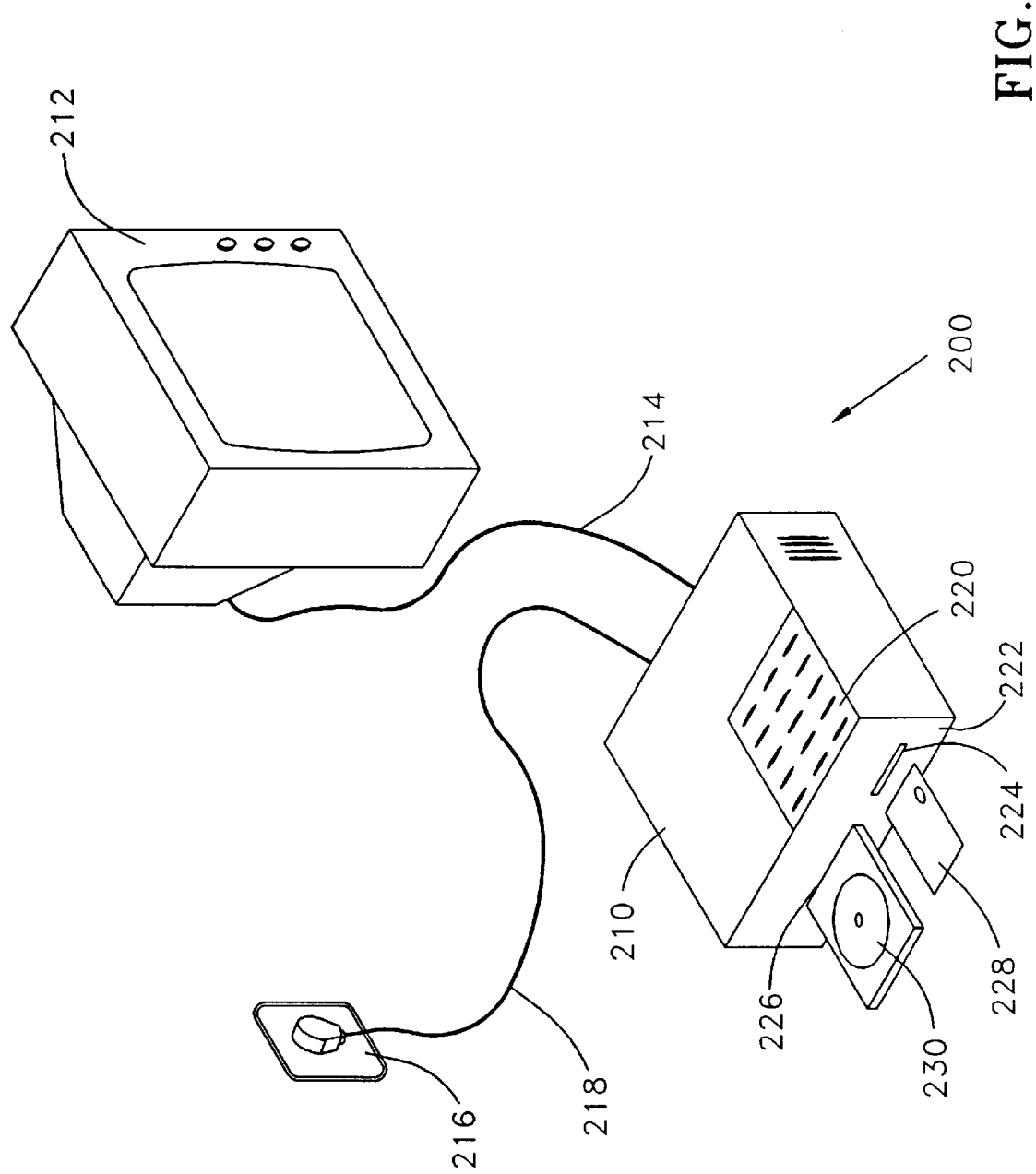
FIG. 6 is an illustration of a data access system constructed and operative in accordance with a preferred embodiment of the invention.

Reference is now made to FIG. 6 which is an illustration of a data access system constructed and operative in accordance with a preferred embodiment of the invention.

The access system of FIG. 6, generally denoted by reference numeral 200, may be employed to provide access to restricted information such as computer generated information, video games, CD-ROM data and data stored on magnetic disks. In a preferred embodiment of the invention the access system is operable with a CATV system.

In accordance with a preferred embodiment of the invention a CATV decoder 210 at a subscriber location is coupled to a television 212 via a coaxial cable 214. CATV decoder 210 is preferably fed from a CATV network (not shown) via a cable outlet 216 and a coaxial cable 218. CATV decoder 210 is preferably operated by a remote control (not shown) or a built-in keypad 220.

CATV decoder 210 includes, at a front panel 222, a card receptacle 224 and a CD-ROM unit having a receptacle 226. CATV decoder 210, incorporating the CD-ROM unit, is hereinafter described with reference to FIG. 7. Preferably, card receptacle 224 may accept a smart card 228. Alternatively, a magnetic card may be employed. In accordance with a preferred embodiment of the invention CATV decoder 210 is operative to decrypt CATV programs which are transmitted from a remote location, and games and data from a compact disk 230. The compact disk may preferably include games and data which are used in combination with data received from CATV transmissions.

It is to be appreciated that the CD-ROM unit may be replaced by an optical card unit, employing optical cards of the size of a credit-card, or a magnetic disk drive employing magnetic disks.

Figure 7:
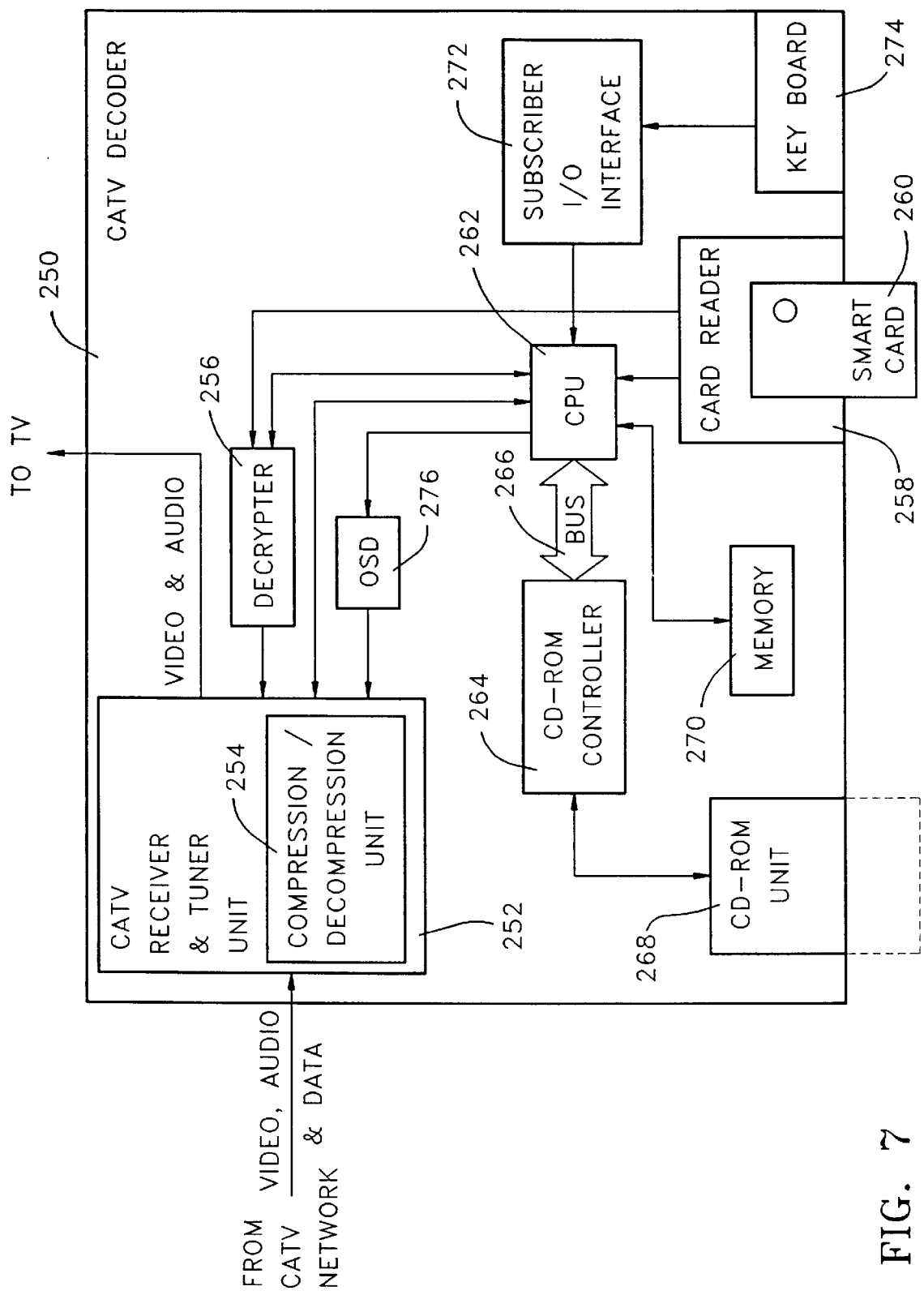
FIG. 7 is an illustration of part of the system of FIG. 6 constructed and operative in accordance with a preferred embodiment of the invention.

Reference is now made to FIG. 7 which is an illustration of a CATV decoder forming part of the system of FIG. 6, constructed and operative in accordance with a preferred embodiment of the invention.

Video, audio and data signals are provided by a CATV network (not shown) to a CATV receiver and tuner unit 252 in a CATV decoder 250. Preferably, CATV receiver and tuner unit 252 includes all circuitry required to provide video and audio signals in a format suitable for display on a television set. CATV receiver and tuner unit 252 may also include a compression/decompression unit 254 to decompress incoming compressed signals.

In a preferred embodiment of the invention a decrypter 256 is operable to decrypt encrypted transmissions prior to providing the video, audio and data signals to the television. Decrypter 256 is operative to receive any of seeds, keys and decryption algorithms from a smart card 260 via a smart card reader 258. Alternatively, decrypter 256 may receive seeds, keys and decryption algorithms via a CPU 262. CPU 262 is coupled to a CD-ROM controller 264 via a communication bus 266. CD-ROM controller 264 is coupled to a CD-ROM unit 268 and is operative to control the operation of CD-ROM unit 268 in accordance with instructions received from CPU 262.

Preferably, smart card 260 also provides any of seeds, keys and decryption algorithms for enabling access to data in a compact disk (not shown) mounted in CD-ROM unit 268. In that case CPU 262 receives any of the seeds, keys and decryption algorithms from smart card 260 via smart card reader 258, and applies decryption algorithms to data received from CD-ROM unit 268 via CD-ROM controller 264. CPU 262 is also coupled to a memory to store and retrieve data in accordance with instructions received from a subscriber, via a subscriber input/output interface 272. Subscriber input/output interface 272 is operable by the subscriber via keyboard 274 or a remote control (not shown). In a preferred embodiment of the invention CPU 262 may employ algorithms received from decrypter 256 and seeds or keys stored in memory 270 to decrypt the information received from the compact disk.

In the absence of smart card 260, or if an invalid card is present, the information received from the CATV network and the information received from the compact disk are not decrypted. Alternatively, separate entitlements may be provided to the subscriber, and CATV transmissions and compact disk data may be separately decrypted. It is to be appreciated that several levels of encryption may be employed so that the CATV transmissions have a higher level of security than the compact disk data, or vice versa.

In a preferred embodiment of the invention the data on the compact disk is not encrypted, but access is denied unless a key is applied to access files on the compact disk. Alternatively, access to the data on the compact disk may be denied or permitted by CPU 262 by controlling the operation of CD-ROM controller 264.

CPU 262 is also operative to provide information to be displayed on the television via an on-screen-display (OSD) 276. OSD 276 prepares the data received from CPU 262 in a format suitable for display on a television set and provides the data to a television via CATV receiver and tuner unit 252.

It is to be appreciated that the systems of FIGS. 6 and 7 may be operable in a stand-alone compact disk access system which is neither part of a CATV system nor coupled to a CATV system. Such a system may be a computer system in which access to a compact disk carrying data is required. In such a case the systems of FIGS. 6 and 7 may be degraded to a system in which smart card 260 enables access to data on a compact disk only via CPU 262, which may be part of the above mentioned computer system. To achieve this, the CATV receiver and tuner unit 252 in FIG. 7 may be omitted, the television 212 may be replaced by a simple computer monitor, the compression/decompression unit 254 may be omitted, if compression/decompression of data is not required, and the connection to cable outlet 216 may be omitted.

If, however, compression/decompression of data is required the compression/decompression unit 254 may remain as an independent unit which is not part of CATV receiver and tuner unit 252. In that case compression/decompression unit 254 may be either part of the computer system or a separate unit thereof, and all data from encryptor 256, CPU 262 and OSD 276 may be received directly at compression/decompression unit 254. Compression/decompression 254 will output data, including video data from a compact disk, to the computer monitor.

The case of stand-alone compact disk access system may be also captured as a special configuration of the systems of FIGS. 6 and 7 in which CATV transmissions are not present.

Figure 8:
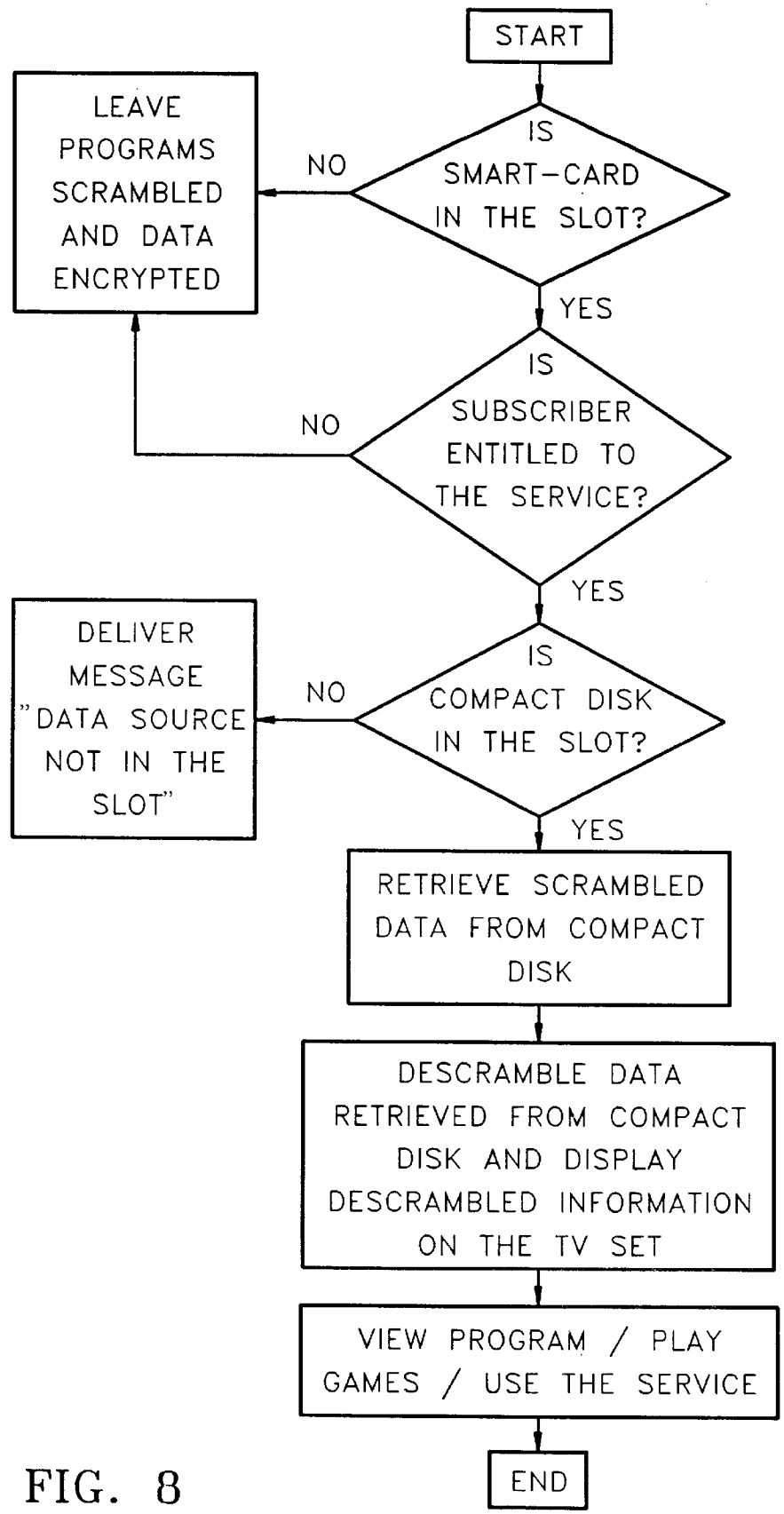
FIG. 8 is a flow chart illustration of the functionality of the apparatus of FIGS. 6 and 7 in accordance with a preferred embodiment of the invention.

Reference is now made to FIG. 8 which is a flow chart illustration of the functionality of the apparatus of FIGS. 6 and 7 in accordance with a preferred embodiment of the invention.

The CATV decoder of FIG. 7 may receive smart cards and any of CD-ROM, optical card and magnetic disk. A subscriber may enter selections via a remote control. If the subscriber does not insert his smart card into the card receptacle, programs and data transmitted via a CATV network remain scrambled. If the smart card is inserted in the card receptacle, the system checks if the subscriber is entitled to the selected service.

If the subscriber is not entitled to the selected service, transmissions and data regarding the selected service remain scrambled. If the subscriber is entitled to the selected service the system checks if the compact disk or the other data source is in the respective receptacle. If the data source is not in inserted in the receptacle, the system delivers a message "data source not in the slot". If the compact disk or data source is inserted in the card receptacle, the data is retrieved and decrypted and transmissions are descrambled so that the subscriber may make use of it.

It is to be appreciated that the systems of FIGS. 6 and 7 and the method described in FIG. 8 may be realized with one card only. In that case the data source may be part of a smart card, so that the smart card includes a memory which is large enough to store application data which may be used either with CATV transmissions or as stand-alone.

Such application data may include the storage of video data, such as video clips or significant events in sports or politics. Alternatively, pictures, voice data, important computer data and music clips may be stored in the smart card. In, a preferred embodiment of the invention application data may be stored in a read-only memory (ROM) in the smart card. Alternatively, application data may be stored in a random-access memory (RAM) in the smart card. In that case the application data may be updated, periodically or upon request, via the CATV network.

In accordance with another preferred embodiment of the invention, a smart card may comprise two integrated circuits. In such a case all the above mentioned access control functions performed with two cards, i.e. parental control, billing and access to areas, are now performed with one card only which incorporates two integrated circuits. For the cases in which access to data is required one integrated circuit is employed for access control and security and the second integrated circuit is mainly employed for data storage. Data from the second integrated circuit is pulled upon authorization from the first integrated circuit. The advantage of such a configuration is that all communications between the two integrated circuits are performed inside the smart card so that hacking becomes more difficult.

It will be appreciated by persons skilled in the art that the present invention is not limited by what has been particularly shown and described hereinabove. Rather the scope of the present invention is defined only by the claims which follow:

We claim:

1. Secure access apparatus for controlling access to a plurality of items, the apparatus comprising:

a first IC card reader adapted to receive a first IC card comprising first control information;

a second IC card reader adapted to receive a second IC card comprising second control information; and a control integrator receiving said first control information and said second control information and operative to allow access to a first one of said plurality of items based, at least in part, on both said first control information and said second control information, wherein said control integrator also allows access to a second one of said plurality of items based, at least in part, on said first control information, without regard to said second control information.

2. Apparatus according to claim 1 and wherein said second control information comprises parental control information.

3. Apparatus according to claim 1 and wherein said plurality of items comprises a plurality of television programs.

4. Apparatus according to claim 1 and wherein said plurality of items comprises a plurality of digital messages.

5. Apparatus according to claim 4 and wherein at least one of said plurality of digital messages comprises a computer program.

6. Apparatus according to claim 4 and wherein at least one of said plurality of digital messages comprises data.

7. Apparatus according to claim 6 and wherein said at least one of said plurality of digital messages comprises multimedia data.

8. Apparatus according to claim 1 and wherein said second control information comprises payment information.

9. A method for controlling access to a plurality of items, the method comprising:

receiving a first IC card comprising first control information;

receiving a second IC card comprising second control information; and allowing access to a first one of said plurality of items based, at least in part, on both said first control information and said second control information, wherein said step of allowing access comprises allowing access to a second one of said plurality of items based, at least in part on said first control information, without regard to said second control information.

10. A method according to claim 9 and wherein said second control information comprises parental control information.

11. A method according to claim 9 and wherein said plurality of items comprises a plurality of television programs.

12. A method according to claim 9 and wherein said plurality of items comprises a plurality of digital messages.

13. A method according to claim 12 and wherein at least one of said plurality of digital messages comprises a computer program.

14. A method according to claim 12 and wherein at least one of said plurality of digital messages comprises data.

15. A method according to claim 14 and wherein said at least one of said plurality of digital messages comprises multimedia data.

16. A method according to claim 9 and wherein said second control information comprises payment information.

* * * * *